Patented Nov. 28, 1944

2,363,687

UNITED STATES PATENT OFFICE 2,363,687

ANTIOXIDANTS

Philip T. Paul, Naugatuck, Conn., assignor to United States Rubber Company, New York, N. Y., a corporation of New Jersey No Drawing. Application July 17, 1943. Serial No. 495,190

16 Claims. (Cl. 260—810)

This invention relates to a new class of antioxidants or age-resisters for organic substances which tend to deteriorate by absorption of oxygen from the air, e. g., rubber or allied gums, unsaturated fatty oils, such as unsaturated vegetable oils, essential oils, petroleum oils and their derivatives such as gasolines, soaps, aldehydes, synthetic resins, turpentine, insecticides such as derris root, cube root and pyrethrum, and the like.

According to the invention, the organic substance is incorporated with a chemical which is a dihydro dihydroxy naphthalene, the hydroxyl groups being ortho or para to one another.

The present chemicals may be synthesized from an ortho or para quinone and a conjugated diene by first reacting these chemicals to form the diene adduct and then isomerizing the diene adduct. The chemistry of the invention is well-known, that is, it involves a Diels-Alder reaction between the quinone and the diene followed by isomerization of the delta-hydrogen atoms to the oxygens of the quinone, which is illustrated by the two reactions below:

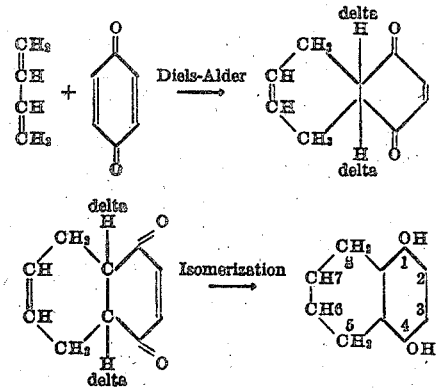

Exemplary of the quinones, the following are included: p-benzoquinone, o-benzoquinone, p-toluquinone, p-chloro benzoquinone, p-bromobenzoquinone, p-anilino benzoquinone, p-dimethyl amino-benzoquinone, p-methoxy benzoquinone, p-phenyl benzoquinone; and p-tertiary amyl-benzoquinone.

Exemplary of the conjugated dienes which may be reacted with any of the above quinones are the following: 1,3-butadiene; 1,3 dimethyl 1,3-butadiene; 1,3 cyclopentadiene; 2,3 dimethyl 1,3-butadiene; 2 phenyl 1,3-butadiene; 2 propyl 1,3-butadiene; 2 methoxy 1,3-butadiene; 1 vinyl 1,3-butadiene; and isoprene.

Among the specific examples of the dihydro naphtho hydroquinones the following are included: 6-methyl 5,8-dihydro 1,4-naphtho hydroquinone (isoprene-p-benzoquinone); 6-ethyl 5,8-dihydro 1,4-naphtho hydroquinone (2-ethyl butadiene-p-benzoquinone); endo 5,8-methylene 5,8-dihydro 1,4-naphtho hydroquinone (1,3 cyclopentadiene-p-benzoquinone); exo 5,8-methylene 5,8-dihydro 1,4-naphtho hydroquinone (1,3 cyclopentadiene-p-benzoquinone); 2-methyl 5,8-dihydro 1,4-naphtho hydroquinone (butadiene-p-tolylquinone); 2-anilino 5,8-dihydro 1,4-naphtho hydroquinone (butadiene-anilino p-benzoquinone); 2-phenyl 5,8-dihydro 1,4-naphtho hydroquinone (butadiene-phenyl p-benzoquinone); and 5,8-dihydro 1,2-naphtho catechol (butadiene-o-benzoquinone).

The preferred compounds are prepared from para-benzoquinone and 1,3-butadiene (5,8-dihydro 1,4-naphtho hydroquinone); para-benzoquinone and 1,3-cyclopentadiene (5,8 endomethylene 5,8-dihydro naphtho hydroquinone); and from para-benzoquinone and 1,3-dimethyl 1,3-butadiene (5,7-dimethyl 5,8-dihydro 1,4-naphtho hydroquinone).

Where 1,3-cyclopentadiene is used, both the endo and exo methylene forms are possible, and both of these forms are considered to be within the scope of the invention.

The following examples are given to further illustrate the invention, the parts being by weight:

EXAMPLE 1—PREPARATION OF 5,8-DIHYDRO 1,4-NAPHTHO HYDROQUINONE

Butadiene (39 gr.) is bubbled into a suspension of 54 gr. p-benzoquinone in 400 cc. benzene in a pressure bottle. The bottle is sealed and the mixture allowed to stand a week. The bulk of the benzene is evaporated and the residue cooled and allowed to crystallize.

The crude diene-quinone adduct is dissolved in 5/3 its weight of glacial acetic acid and 2 to 3 drops of 40% hydrobromic acid are added. An exothermic reaction follows which lasts a few minutes. On cooling, the reaction mixture sets to a paste. It is filtered and recrystallized from ethyl acetate.

Melting range 210–211° C. (uncorrected). Alder et al., Ber. 62, 2337 (1929) report a melting point of 212° C. for this material.

EXAMPLE 2—PREPARATION OF 5,7-DIMETHYL 5,8-DIHYDRO 1,4-NAPHTHO HYDROQUINONE

A mixture of 27 gr. freshly steam-distilled p-benzoquinone and 82 gr. 1,3-dimethyl 1,3-butadiene in 50 cc. benzene are allowed to stand in a bottle 2 days at room temperature. During the course of 5 days a total of approximately 10 grams of material analyzing for an adduct of 2 mols 1,3-dimethyl 1,3-butadiene to 1 mol p-benzoquinone separated and was discarded. It melted at 188–192° C.

The mother liquor from this material is a viscous yellow oil. It is dissolved in an equal volume of glacial acetic acid and a few drops of 40% hydrobromic acid. A vigorous exothermic reaction sets in which lasts a few minutes. After cooling, the reaction mixture is mixed with benzene and then washed with water. The benzene solution is dried over sodium sulfate, and evaporated, the last traces of the benzene being removed under a high vacuum. The residue on standing sets to a dark red brittle resin which as such is suitable for use in rubber. The resin consists essentially of a mixture of 5,7-dimethyl 5,8-dihydro 1,4-naphthoquinone; 1,4,5,8-tetra hydro 1,3,6,8-tetra methyl 9,10-dihydroxy anthracene and 1,4,5,8-tetrahydro 2,4,6,8-tetramethyl 9,10-dihydroxy anthracene.

EXAMPLE 3—RUBBER TESTS

*Master batch*

|  | Parts |
|---|---|
| Pale crepe | 100 |
| Zinc oxide | 10 |
| Lithopone | 60 |
| Whiting | 60 |
| Sulfur | 3 |
| Tetramethyl thiuram monosulfide (accelerator) | 0.15 |

To the above master batch 5,8-dihydro 1,4-naphtho hydroquinone and 5,7-dimethyl 5,8-dihydro 1,4-naphtho hydroquinone are added in the ratio of 1.0 part to 100 parts of rubber. Cures are made for 10, 20 and 30 minutes at 25 pounds per square inch steam pressure.

*Unaged tensiles and elongations*

| Cure in minutes at 25 lbs. per sq. in. steam pressure | Control | | 5,8-dihydro 1,4-naphtho hydroquinone | | 5,7-dimethyl 5,8-dihydro 1,4-naphtho hydroquinone | |
|---|---|---|---|---|---|---|
|  | T | E | T | E | T | E |
| 10 | 2,120 | 730 | 2,260 | 703 | 2,200 | 703 |
| 20 | 2,360 | 683 | 2,160 | 665 | 2,000 | 650 |
| 30 | 2,000 | 680 | 2,000 | 683 | 2,200 | 710 |

The stocks are aged in oxygen 72 hours at 70° F. under 300 pounds per square inch pressure, the results being as follows:

| Cure in minutes at 25 lbs. per sq. in. steam pressure | Control | | 5,8-dihydro 1,4-naphtho hydroquinone | | 5,7-dimethyl 5,8-dihydro 1,4-naphtho hydroquinone | |
|---|---|---|---|---|---|---|
|  | T | E | T | E | T | E |
| 10 | 720 | 620 | 1,610 | 680 | 1,800 | 673 |
| 20 | 340 | 433 | 1,340 | 666 | 1,290 | 646 |
| 30 | 60 | 126 | 1,360 | 650 | 1,550 | 643 |

Tensiles (T) are in pounds per square inch; and elongations (E) are in per cent.

EXAMPLE 4

A copolymer of butadiene and styrene (Buna S) is mixed with the above antioxidants on a mill in the ratio of 1.0 part antioxidant to 100.0 parts copolymer. The copolymer is aged 5 days at 212° F. and then mixed on a mill with the usual compounding ingredients; cured and tensiled.

When finally compounded, the copolymer rubber stock is as follows; the parts being by weight:

|  | Parts |
|---|---|
| Butadiene-styrene copolymer | 100 |
| Coal tar | 5 |
| Sulfur | 2.0 |
| Carbon black | 50 |
| Stearic acid | 2 |
| Zinc oxide | 5 |
| Mercaptobenzothiazole (accelerator) | 1.5 |
| Antioxidant | 1.0 |

The antioxidant stocks showed higher tensiles and elongations than the control stock although the protective action was not as pronounced in the copolymer as in the natural rubber stock.

It is to be understood that other desired filling and compounding ingredients may be incorporated along with the preservative, for example, there may be incorporated other accelerators, softeners, etc.

The antioxidant may be incorporated in any type of rubber composition, such as those used for automobile tires and tubes, hose, belting, sheet and thread rubber, rubberized fabrics, molded goods, boots and shoes, etc., whether vulcanized in a mold, in open steam, in hot air, or in the cold by the so-called acid process. The proportion of the antioxidant may vary from about 0.1% to 5%, although either smaller or greater proportions may be found useful. If the material to which it is added is a liquid such as rubber cement or an oil, the antioxidant may be dissolved therein in a suitable small proportion. The antioxidant may be incorporated into solid substances by milling or mastication, and prepared for incorporation into dispersions or solutions either in powder, paste or solution form, or applied in such forms for incorporation by diffusion, to the surface of vulcanized or unvulcanized rubber goods.

The term "a rubber" is employed in the claims to define a vulcanizable plastic material which possesses high extensibility under load coupled with the property of flexibly retracting to approximately its original size and shape after the load is removed and includes india rubber, balata, gutta percha, and other natural rubbers as well as synthetic vulcanizable products such as polychloroprene, olefin polysulfides, butadiene polymers, and modified butadiene polymers (Buna N and Buna S), and the like, which have a flexibility and elasticity similar to rubber, and reclaims and latices of such material, which deteriorate upon ageing, whether or not admixed with fillers, pigments, accelerating agents, etc.

Having thus described my invention, what I claim and desire to protect by Letters Patent is:

1. A method of retarding the deterioration of an organic substance which tends to deteriorate by absorption of oxygen from the air which comprises incorporating therein a 5,8 dihydro dihydroxy naphthalene in which the hydroxy groups belong to the class consisting of ortho, and para placement to each other in the naphthalene nucleus.

2. A method of retarding the deterioration of an organic substance which tends to deteriorate by absorption of oxygen from the air which comprises incorporating therein a 5,8 dihydro 1,4-dihydroxy naphthalene.

3. A method of retarding the deterioration of an organic substance which tends to deteriorate by absorption of oxygen from the air which comprises incorporating therein a 5,8-dihydro dihydroxy naphthalene in which the dihydroxy groups are chosen for placement from the class consisting of the 1,2 and the 1,4 positions in the naphthalene nucleus.

4. A method of retarding the deterioration of an organic substance which tends to deteriorate by absorption of oxygen from the air which comprises incorporating therein a 5,8-dihydro 1,4-dihydroxy naphthalene.

5. A method of preserving a rubber composition which comprises incorporating therein a 5,8-dihydro dihydroxy naphthalene in which the dihydroxy groups are chosen for placement from the class consisting of the 1,2 and the 1,4 positions in the naphthalene nucleus.

6. A method of preserving a rubber composition which comprises incorporating therein a 5,8-dihydro 1,4-dihydroxy naphthalene.

7. A method of preserving a rubber composition which comprises incorporating therein a 5,8-dihydro dihydroxy naphthalene in which the dihydroxy groups are chosen for placement from the class consisting of the 1,2 and the 1,4 positions in the naphthalene nucleus.

8. A method of preserving a rubber composition which comprises incorporating therein a 5,8-dihydro 1,4-dihydroxy naphthalene.

9. A method of retarding the deterioration of an organic substance which tends to deteriorate by absorption of oxygen from the air which comprises incorporating therein 5,8-dihydro 1,4-dihydroxy naphthalene.

10. A method of retarding the deterioration of an organic substance which tends to deteriorate by absorption of oxygen from the air which comprises incorporating therein 5,7-dimethyl 5,8-dihydro 1,4-dihydroxy naphthalene.

11. An organic substance which tends to deteriorate by absorption of oxygen from the air containing a 5,8-dihydro dihydroxy naphthalene in which the dihydroxy groups are chosen for placement from the class consisting of the 1,2 and the 1,4 positions in the naphthalene nucleus.

12. A rubber composition containing a 5,8-dihydro dihydroxy naphthalene in which the dihydroxy groups are chosen for placement from the class consisting of the 1,2 and the 1,4 positions in the naphthalent nucleus.

13. An organic substance which tends to deteriorate by absorption of oxygen from the air containing a 5,8-dihydro dihydroxy naphthalene in which the dihydroxy groups are chosen for placement from the class consisting of the 1,2 and the 1,4 positions in the naphthalene nucleus.

14. A rubber composition containing a 5,8-dihydro dihydroxy naphthalene in which the dihydroxy groups are chosen for placement from the class consisting of the 1,2 and the 1,4 positions in the naphthalene nucleus.

15. An organic substance which tends to deteriorate by absorption of oxygen from the air containing 5,8-dihydro 1,4-dihydroxy naphthalene.

16. An organic substance which tends to deteriorate by absorption of oxygen from the air containing 5,7-dimethyl 5,8-dihydro 1,4-dihydroxy naphthalene.

PHILIP T. PAUL.